April 7, 1925.
W. MEREDITH ET AL
FLOW NOZZLE STRUCTURE
Filed Aug. 18, 1924
1,532,253
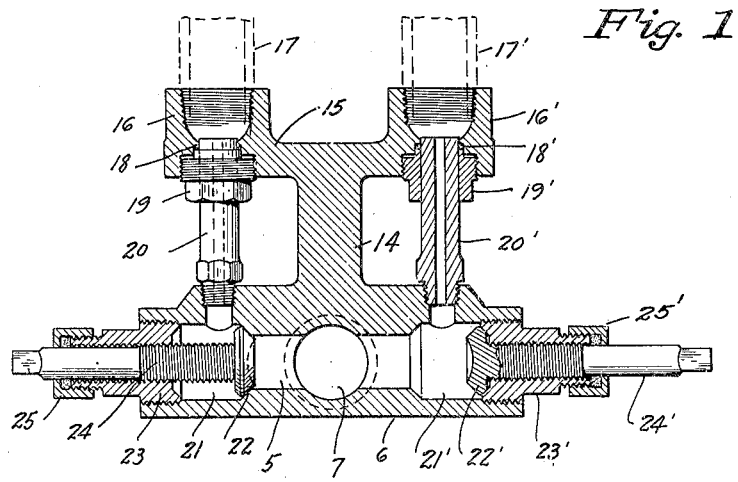
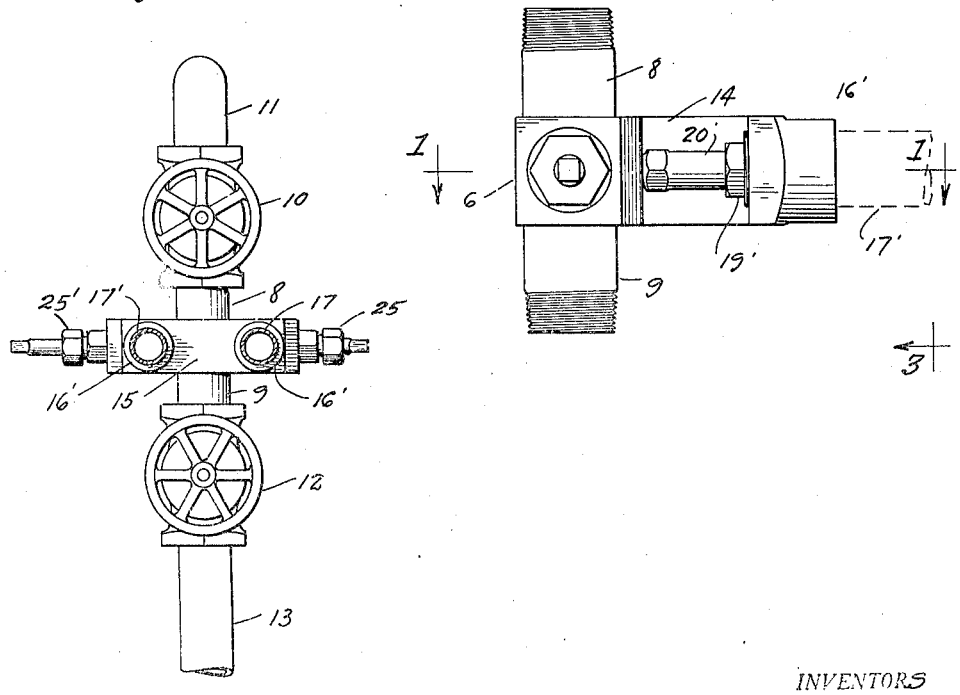
INVENTORS
Walter L. Foster
William Meredith
Stephen A. D. Cox
BY Westall and Wallace
ATTORNEYS.

Patented Apr. 7, 1925.

1,532,253

UNITED STATES PATENT OFFICE.

WILLIAM MEREDITH AND STEPHEN A. D. COX, OF HUNTINGTON BEACH, AND WALTER L. FOSTER, OF WHITTIER, CALIFORNIA.

FLOW-NOZZLE STRUCTURE.

Application filed August 18, 1924. Serial No. 732,795.

*To all whom it may concern:*

Be it known that we, WILLIAM MEREDITH and STEPHEN A. D. COX, citizens of the United States, and residents of Huntington Beach, in the county of Orange, State of California, and WALTER L. FOSTER, citizen of the United States, and resident of Whittier, in the county of Los Angeles, State of California, have invented new and useful Improvements in a Flow-Nozzle Structure, of which the following is a specification.

This invention relates to a device for introduction in a conduit line through which liquid flows at a high velocity and under high pressure and whose function is to restrict such flow. More particularly, the present invention appertains to a device having replaceable tubular restriction members.

The embodiment of the invention disclosed herein is adapted for use with flowing oil wells. Petroleum flowing from such wells contains sand and like foreign matter which soon wears and cuts away the bore of the restriction member, making it unserviceable and requiring replacement. This operation is usually accomplished by shutting off the flow of petroleum, removing and replacing the restriction members. Where a single flow nozzle is employed, the flow from the well is shut off during replacement thereby resulting in building up pressure to the detriment of parts of the structure and danger to the operator. Furthermore, a loss of time results. To overcome this objection, it has been the practice to install a pair of flow nipples so that one may serve as a bypass for the other during replacement. Suitable valves are included in the structure for shutting off the flow through either or both nipples. Such structure consists of an assembly of fittings, which are expensive, cumbersome and complicated in structure and manipulation.

The primary object of this invention is to provide a structure having a plurality of replaceable nipples together with valves for controlling the flow, the structure being unitary, simple, compact, and economical to manufacture.

These objects together with other objects and corresponding accomplishments are obtained by means of the embodiment of our invention illustrated in the accompanying drawing, in which:

Fig. 1 is a horizontal section through a structure built in accordance with our invention and as seen looking in the direction of the arrows 1—1 of Fig. 2; Fig. 2 is a side elevation; and Fig. 3 is a side view as seen looking in the direction of the arrows 3—3 of Fig. 2.

Referring more particularly to the drawing, a block generally of H-form and having a transverse bore 5 extending through leg 6 is shown. Extending through the leg and intersecting the bore 5 is a passage 7. Nipples 8 and 9 are connected to the passage 7 to form extensions thereof. Connected to nipple 8 is a valve 10 preferably of the gate valve type. The other end of the gate valve housing is closed by a bull plug 11. Connected to the nipple 9 is a master gate valve 12. Gate valve 12 is connected by a pipe 13 to the casing head of the oil well.

Cross member 14 of the block has at the other end thereof a leg 15 provided at its end with similar caps for supporting flow nipples. It will be sufficient to describe one of these caps. It comprises a tubular portion 16 with the bore thereof extending transverse to leg 15 and facing leg 5. It is internally threaded to receive a pipe indicated in dotted lines and marked 17 leading to a sump or other oil collecting receptacle. The bore is reduced in diameter adjacent the center and then counterbored to form a shoulder and recess for receiving a packing 18. The bore is further enlarged in diameter to receive a gland nut 19, through which the flow nipple 20 is attached.

Each end of leg 6 is similarly constructed to cooperate with the flow nipple at its end. One will be described. Bore 6 is enlarged in diameter as indicated by 21, a seat being formed for valve disk 22. The outer end of the enlarged portion 21 of the bore is threaded to receive a plug 23 having a bore extending therethrough to receive the stem 24 of the valve 22. The end of the stem is squared to provide a wrench hold. Mounted over the stem is a packing cap 25 to provide a leak tight fit. The corresponding parts associated with the other nipple are similarly marked with primes added to the reference numerals.

The structure is mounted in a line as indicated in the Fig. 1 with one of the valves seated. Fig. 1 shows valve 22 seated. This cuts off the flow of petroleum through nipple 20. Valve 22' is unseated so that petroleum may flow from the casing head through pipe 13, valve 12, bore 7, bore 6, the flow nipple 20' and to the sump through pipe 17'. When it becomes necessary to replace flow nipple 20', a wrench is applied to the valve stem 24' and the valve 22' is seated cutting off the flow of oil through nipple 20'. At the same time valve 22 is turned so as to unseat it and permit the flow of oil through nipple 20. Gland nut 19' is unscrewed, a wrench applied to the nipple 20' and the latter unscrewed from leg 6. It is then replaced by a new nipple and is ready for operation. By removal of bull plug 11 and opening of the gate valves 10 and 12 as desired, access may be had through the casing or part thereof with tools or any other desired apparatus.

What we claim is:

1. A flow nozzle structure comprising a body having a main passage extending thereinto and adapted to be connected to a well, there being branch passages extending from said main passage, said branch passages having outlet openings, caps having openings, one aligned with and facing each outlet opening, and a flow nipple bridging the space between each outlet opening and cap, said flow nipple being mounted so as to be laterally removable.

2. A flow nozzle structure comprising a body having a main passage extending thereinto and adapted to be connected to a well, there being branch passages extending from said main passage, said branch passages having outlet openings, caps having openings, one opening aligned with and facing each outlet opening, a flow nipple bridging the space between each outlet opening and cap, each of said flow nipples being mounted so as to be laterally removable, and a valve for each branch passage.

3. A flow nozzle structure comprising a body having a main passage extending therethrough and adapted to be connected to a well, a plug closing the other end of the passage, there being branch passages extending from said main passage, said branch passages having outlet openings, caps having openings one aligned with and facing each outlet opening, a flow nipple bridging the space between each outlet opening and cap, said flow nipple being laterally removable.

4. A flow nozzle structure comprising a block having a main passage extending therethrough and adapted to be connected to a well, a plug closing the other end of said passage, there being branch passages extending from said main passage, said branch passages having outlet ports, caps having openings one aligned with and facing each outlet opening, a flow nipple bridging the space between each port and cap, said flow nipples being laterally removable, and a valve for each branch passage.

5. A flow nozzle structure comprising a body having a main passage extending therethrough and adapted to be connected to a well, a plug closing the other end of said passage, there being branch passages extending from said main passage, said branch passages having outlet ports, caps having openings, one aligned with and facing each outlet port, a flow nipple bridging the space between each port and cap, said flow nipples being laterally removable, a gate valve in said main passage between said plug and the juncture of said passages, and a gate valve on the other side of said juncture in said main passage.

6. A flow nozzle structure comprising a block having a main passage extending therethrough and adapted to be connected to a well, a plug closing the other end of the passage, there being branch passages extending from said main passage, said branch passages having outlet ports, caps having openings, one aligned with and facing each outlet port, a flow nipple bridging the space between each port and cap, said flow nipple being laterally removable, a valve for each branch passage, a gate valve in said main passage between said plug and the juncture of said passages, and a gate valve on the other side of said juncture.

In witness that we claim the foregoing we have hereunto subscribed our names this 4th day of August, 1924.

WALTER L. FOSTER.
WILLIAM MEREDITH.
STEPHEN A. D. COX.